(12) United States Patent
Ding

(10) Patent No.: US 12,443,304 B1
(45) Date of Patent: Oct. 14, 2025

(54) CAPACITIVE SENSING CIRCUIT, SYSTEM, AND DEVICE THEREOF

(71) Applicant: Kunshan Yunyinggu Electronic Technology Co., Ltd., Kunshan (CN)

(72) Inventor: Xingbo Ding, Kunshan (CN)

(73) Assignee: Kunshan Yunyinggu Electronic Technology Co., Ltd., Kunshan (CN)

( * ) Notice: Subject to any disclaimer, the term of this patent is extended or adjusted under 35 U.S.C. 154(b) by 0 days.

(21) Appl. No.: 19/016,182

(22) Filed: Jan. 10, 2025

Related U.S. Application Data

(63) Continuation of application No. PCT/CN2024/142947, filed on Dec. 27, 2024.

(51) Int. Cl.
G06F 3/041 (2006.01)
G06F 3/044 (2006.01)

(52) U.S. Cl.
CPC .......... *G06F 3/0416* (2013.01); *G06F 3/0446* (2019.05)

(58) Field of Classification Search
None
See application file for complete search history.

(56) References Cited

U.S. PATENT DOCUMENTS

2017/0336889 A1* 11/2017 Saether ............... G06F 3/04164
2021/0373736 A1* 12/2021 Chen ................... G06F 3/04184

* cited by examiner

*Primary Examiner* — Stephen T. Reed
(74) *Attorney, Agent, or Firm* — Bayes PLLC

(57) ABSTRACT

In certain aspects, a capacitive sensing circuit includes a current mirror circuit configured to receive two input current signals associated with two respective capacitance values and send two mirrored current signals, a current-differential current-summing circuit configured to receive the two mirrored current signals from the current mirror circuit and send a current-differential signal and a current-summing signal, a transconductor circuit including a transconductor, and the transconductor circuit is configured to receive the current-differential signal and send a feedback current, and a clamping circuit configured to receive the feedback current and minimize a difference between two voltages of two respective nodes of the current mirror circuit.

20 Claims, 4 Drawing Sheets

CAPACITIVE SENSING CIRCUIT, SYSTEM, AND DEVICE THEREOF

CROSS-REFERENCE TO RELATED APPLICATIONS

This application is a continuation of International Application No. PCT/CN2024/142947, filed on Dec. 27, 2024, which is incorporated herein by reference in its entirety.

BACKGROUND

The present disclosure relates to capacitive sensing circuit, system, and device thereof.

Capacitive sensing, especially capacitive touch sensing, is a technique using the change in capacitance that occurs when an object, such as a human finger or a stylus pen, approaches a capacitor. The presence of the finger or the stylus pen increases the capacitance by introducing a substance with a relatively high dielectric constant (e.g., the human body or the pen) and providing a conductive surface that creates additional capacitance in parallel with the existing capacitor.

SUMMARY

In one aspect, a capacitive sensing circuit includes a current mirror circuit configured to receive two input current signals associated with two respective capacitance values and send two mirrored current signals, a current-differential current-summing circuit configured to receive the two mirrored current signals from the current mirror circuit and send a current-differential signal and a current-summing signal, a transconductor circuit including a transconductor, and the transconductor circuit is configured to receive the current-differential signal and send a feedback current, and a clamping circuit configured to receive the feedback current and minimize a difference between two voltages of two respective nodes of the current mirror circuit.

In some implementations, the current mirror circuit includes a first transistor, a second transistor, a third transistor, and a fourth transistor. The first transistor and the second transistor are connected via a first common source node, and the third transistor and the fourth transistor are connected via a second common source node.

In some implementations, the first transistor and the second transistor are configured to receive the two input current signals associated with the two respective capacitance values, and the third transistor and the fourth transistor are configured to send the two mirrored current signals.

In some implementations, a first gate of the first transistor and a fourth gate of the fourth transistor are connected, and a second gate of the second transistor and a third gate of the third transistor are connected.

In some implementations, the current-differential signal is configured to be an output current.

In some implementations, the current-summing signal is configured to provide an output voltage passing through an output resistance.

In some implementations, the transconductor includes a negative input terminal and a positive input terminal, and the negative input terminal is configured to receive the current-differential signal, and the positive input terminal is grounded.

In some implementations, the clamping circuit includes a bias current source, an operational amplifier, and a fifth transistor. A positive input end of the operational amplifier is configured to receive the feedback current, a negative input end of the operational amplifier is connected to be connected to a source end of the fifth transistor, and an output end of the operational amplifier is configured to be connected to a gate end of the fifth transistor.

In some implementations, the clamping circuit is configured to be connected to an input voltage, and the input voltage is provided to the current mirror circuit via the bias current source and the fifth transistor.

In some implementations, the current mirror circuit is configured to receive the two input current signals associated with the two respective capacitance values of a touch panel circuit.

In another aspect, a touch panel device includes a touch panel circuit including a capacitance array, a driving circuit coupled to the touch panel circuit and configured to drive a transmitter voltage to the capacitance array, a sensing control circuit coupled to the touch panel circuit and configured to receive a receiver voltage from the capacitance array, a capacitive sensing circuit coupled to the sensing control circuit and configured to detect a capacitance of the capacitance array, a microcontroller unit (MCU) configured to perform operations of the touch panel device, and a memory configured to store data received from the capacitive sensing circuit or the MCU. The capacitive sensing circuit includes a current mirror circuit configured to receive two input current signals associated with two respective capacitance values and send two mirrored current signals, a current-differential current-summing circuit configured to receive the two mirrored current signals from the current mirror circuit and send a current-differential signal and a current-summing signal, a transconductor circuit including a transconductor, and the transconductor circuit is configured to receive the current-differential signal and send a feedback current; and a clamping circuit configured to receive the feedback current and minimize the difference between two voltages of two respective nodes of the current mirror circuit.

In some implementations, the current mirror circuit includes a first transistor, a second transistor, a third transistor, and a fourth transistor. The first transistor and the second transistor are connected via a first common source node, and the third transistor and the fourth transistor are connected via a second common source node.

In some implementations, the first transistor and the second transistor are configured to receive the two input current signals associated with the two respective capacitance values, and the third transistor and the fourth transistor are configured to send the two mirrored current signals.

In some implementations, a first gate of the first transistor and a fourth gate of the fourth transistor are connected, and a second gate of the second transistor and a third gate of the third transistor are connected.

In some implementations, the current-differential signal is configured to be an output current.

In some implementations, the current-summing signal is configured to provide an output voltage passing through an output resistance.

In some implementations, the transconductor includes a negative input terminal and a positive input terminal, the negative input terminal is configured to receive the current-differential signal, and the positive input terminal is grounded.

In some implementations, the clamping circuit includes a bias current source, an operational amplifier, and a fifth transistor. A positive input end of the operational amplifier is configured to receive the feedback current, a negative input end of the operational amplifier is connected to be connected to a source end of the fifth transistor, and an output end of the operational amplifier is configured to be connected to a gate end of the fifth transistor.

In some implementations, the clamping circuit is configured to be connected to an input voltage. The input voltage is provided to the current mirror circuit via the bias current source and the fifth transistor.

In some implementations, the current mirror circuit is configured to receive the two input current signals associated with the two respective capacitance values of the touch panel circuit.

In still another aspect, a method for controlling a circuit for capacitive sensing includes receiving two input current signals associated with two respective capacitance values and sending two mirrored current signals, receiving the two mirrored current signals and sending a current-differential signal and a current-summing signal, receiving the current summing signal and sending a feedback current, and receiving the feedback current and minimizing a difference between two voltages of two respective nodes of a current mirror circuit.

In some implementations, the circuit for capacitive sensing includes the current mirror circuit, a current-differential current-summing circuit, a transconductor circuit, and a clamping circuit. Receiving the two input current signals associated with the two respective capacitance values and sending the two mirrored current signals are performed by the current mirror circuit coupled to a touch panel circuit, and the two respective capacitance values are received by two respective transparent electrodes in the touch panel circuit.

In some implementations, receiving the two mirrored current signals and sending the current-differential signal and the current-summing signal are performed by the current-differential current-summing circuit.

In some implementations, receiving the current summing signal and sending the feedback current are performed by the transconductor circuit.

In some implementations, receiving the feedback current and minimizing the difference between the two voltages of the two respective nodes of the current mirror circuit are performed by the clamping circuit.

BRIEF DESCRIPTION OF THE DRAWINGS

The accompanying drawings, which are incorporated herein and form a part of the specification, illustrate aspects of the present disclosure and, together with the description, further serve to explain the principles of the present disclosure and to enable a person skilled in the pertinent art to make and use the present disclosure.

Figure 1:
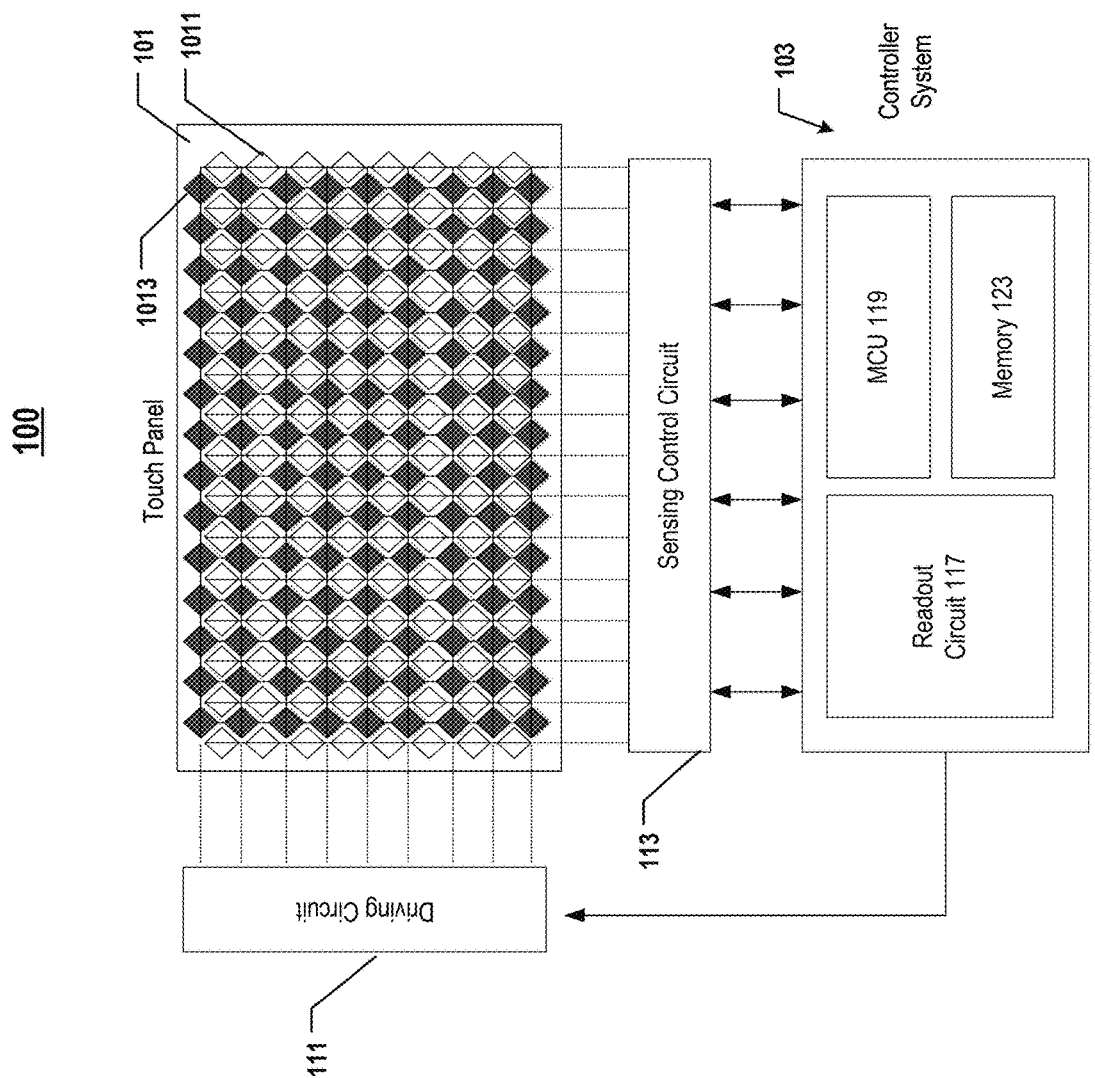
FIG. 1 illustrates a schematic diagram of a touch device, according to some aspects of the present disclosure.

The present disclosure will be described with reference to the accompanying drawings.

DETAILED DESCRIPTION

Although specific configurations and arrangements are discussed, it should be understood that this is done for illustrative purposes only. As such, other configurations and arrangements can be used without departing from the scope of the present disclosure. Also, the present disclosure can also be employed in a variety of other applications. Functional and structural features as described in the present disclosures can be combined, adjusted, and modified with one another and in ways not specifically depicted in the drawings, such that these combinations, adjustments, and modifications are within the scope of the present disclosure.

In general, terminology may be understood at least in part from usage in context. For example, the term "one or more" as used herein, depending at least in part upon context, may be used to describe any feature, structure, or characteristic in a singular sense or may be used to describe combinations of features, structures, or characteristics in a plural sense. Similarly, terms, such as "a," "an," or "the," again, may be understood to convey a singular usage or to convey a plural usage, depending at least in part upon context. In addition, the term "based on" may be understood as not necessarily intended to convey an exclusive set of factors and may, instead, allow for existence of additional factors not necessarily expressly described, again, depending at least in part on context.

It should be readily understood that the meaning of "coupled to," and "connected to," in the present disclosure should be interpreted in the broadest manner such that "coupled to" not only means "directly coupled to" something but also includes the meaning of "coupled to" something with an intermediate feature or a component therebetween.

Capacitive touch sensing can be used in a wide range of applications including many consumer electronics such as touch panel buttons of home appliances, and touch screens of cell phones. It is therefore highly related to people's daily life. Conventional capacitive touch sensing technology is based on a capacitance voltage converter or a capacitance voltage conversion circuit to convert the capacitance variations to electric signals, e.g., voltage signals. However, one of the problems of the capacitance voltage converter is that the measurement of the capacitance value may exist nonlinear distortion where it occurs when the output signal may not be an exact reproduction of the original input signal waveform. The nonlinear distortion may need additional compensation circuits, control logics, or algorithms to correct these signal distortions. Furthermore, another problem of the capacitance voltage converter is that it is much easier to be disturbed by externally coupled voltages. As such, the sensitivity of the touch screen or touch panel button will be reduced, and thus the user experience will be less satisfying. Furthermore, the sampling circuit and the integrator circuit in capacitance voltage converter consume a considerable area.

To address one or more of the aforementioned issues, the present disclosure introduces a solution in which a current-type capacitance detection circuit is introduced. First, by using a current to detect or sense capacitance changes, it may enhance the accuracy of the detection. In particular, since the nonlinear distortion can be minimized by using the current-type capacitance detection, the sensitivity and the quality of the touch panel products can be effectively increased, thereby increasing the overall user experiences.

Moreover, by using the current-type capacitance detection rather than voltage capacitance converter, no additional capacitances, such as MIM (Metal-Insulator-Metal) or MOM (Metal-Oxide-Metal) capacitors, will be needed. These MIM or MOM capacitors are the main source of area consumption of the capacitance detection circuit. By reducing additional MIM or MOM capacitors, the cost of the capacitance detection circuit can also be minimized.

Furthermore, the voltage signals in the voltage capacitance converter may need to be adjusted by multiples with additional operational amplifiers before accumulating the voltage signals in integrators, while the current-type capacitance detection circuit only needs integrators, thereby reducing additional operational amplifiers. Therefore, the area consumption and the cost can also be minimized.

In particular, the current mirror circuit, according to some implementations of the present disclosure, may be configured to be a current source transferring the current signals received from the touch panel circuit and providing a constant current to the current-differential current-summing circuit.

In addition, the current output from the current mirror circuit can be adjusted by a feedback circuit (e.g., a negative feedback loop) coupled to the current mirror circuit to suppress disturbing signals and reduce noises, thereby enhancing the sensitivity of detection. Furthermore, if multiplying the current signals is needed, it can be easily achieved by adjusting the current mirror circuit. And the current mirror circuit has a relatively small area consumption compared to other signal amplifiers.

In addition, the clamping circuit, according to some implementations of the present disclosure, may provide overvoltage protection that shuts down the supply, or clamps the output when the voltage exceeds a preset level. Also, the clamping circuit may reduce the channel length modulation effect by making the two voltages on two respective nodes in the current mirror circuit almost the same, thereby minimizing the current difference between the two respective nodes for, e.g., less than 1%. The further increase of the sensitivity of the capacitance detection circuit.

Last, the current-differential current-summing circuit in combination with transconductor circuit, may reduce the non-linearity issue and the sensitivity to the parasitic sensor capacitance, which is undesirable.

FIG. 1 illustrates a schematic diagram of a touch device 100, according to some aspects of the present disclosure. As shown in FIG. 1, touch device 100 includes a touch panel 101. Touch panel 101 may include a first transparent electrode 1011 extending in an x-direction and a second transparent electrode 1013 extending in an y-direction intersected with first transparent electrode 1011 in a plan view. When a user touches the touch panel 101, the capacitance signals in such coordinates or the positions are received via first transparent electrode 1011 and second transparent electrode 1013. In some implementations, a protective cover (not shown) can be formed on first transparent electrode 1011 and second transparent electrode 1013 and is configured to be a contact interface for the user's touch. In addition, a substrate (e.g., a glass substrate) may be formed below first transparent electrode 1011 and second transparent electrode 1013 and is configured to be a supporting base for first transparent electrode 1011 and second transparent electrode 1013. Moreover, in some implementations, a display is formed below the substrate. The display includes liquid crystal display (LCD) or light-emitting diode (LED) display. The LCD includes thin-film transistor (TFT) LCD. The LED display includes LED backlit display, organic LED (OLED) display, active-matrix organic light-emitting diodes (AMOLED) display, quantum dot LED (QLED) display, mini LED display, or micro-LED display.

Touch device 100 may further include a driving circuit 111 coupled to touch panel 101, and a sensing control circuit 113 coupled to touch panel 101. Driving circuit 111 may include a transmitter (Tx) and is configured to apply a Tx voltage to a capacitance array under electrodes (e.g., first transparent electrode 1011 and second transparent electrode 1013) of touch panel 101. The capacitance array may include multiple capacitances below corresponding electrodes such that the position of the user's touch point can be detected. Sensing control circuit 113 may include a receiver (Rx) and is configured to receive an Rx voltage from electrodes (e.g., first transparent electrode 1011 and second transparent electrode 1013) of touch panel 101 through the capacitance array. Specifically, the detection is through applying a voltage to this capacitance array to create a uniform electrostatic field, which can be measured by sensing control circuit 113. When a conductive object (e.g., a user's finger) touches touch panel 101, it will distort the electrostatic field of the electrodes that are nearby the touchpoint, and the capacitance changes can thus be measured.

Touch device 100 may further include a controller system 103 coupled to driving circuit 111 and sensing control circuit 113 and configured to receive command and execute operations of touch device 100 including controlling driving circuit 111 and sensing control circuit 113. In some implementations, controlling driving circuit 111 and sensing control circuit 113 are parts of controller system 103. Controller system 103 may include a readout circuit 117, a microcontroller unit (MCU) 119, and a memory 123. Readout circuit 117 may include a capacitance sensing circuit according to some implementations of the present disclosure. Readout circuit 117 is configured to read out the data (e.g., capacitance value or capacitance value in terms of current value) from touch panel 101 via sensing control circuit 113. The capacitance sensing circuit will be discussed later. In some implementations, readout circuit 117 may further include integrators coupled to the capacitance sensing circuit, and an analog-to-digital converter (ADC) coupled to the integrators. MCU 119 is configured to perform operations including signal processing of the digital signals received from the ADC by using algorithms implanted in a field-programmable gate array (FPGA), control logics, or other related integrated circuits. Signal processing of the signals may include noise filtering, position determination, feature extraction, or other signal processing techniques. Memory 123 is configured to store data received from readout circuit 117 or MCU 119. In some implementations, memory 123 includes volatile memory such as static random access memory (SRAM) or dynamic random access memory (DRAM), or non-volatile memory such as ferroelectric random access memory (FeRAM), resistive random access memory (RRAM), phase-change random access memory (PCRAM), or flash memory.

Figure 2:
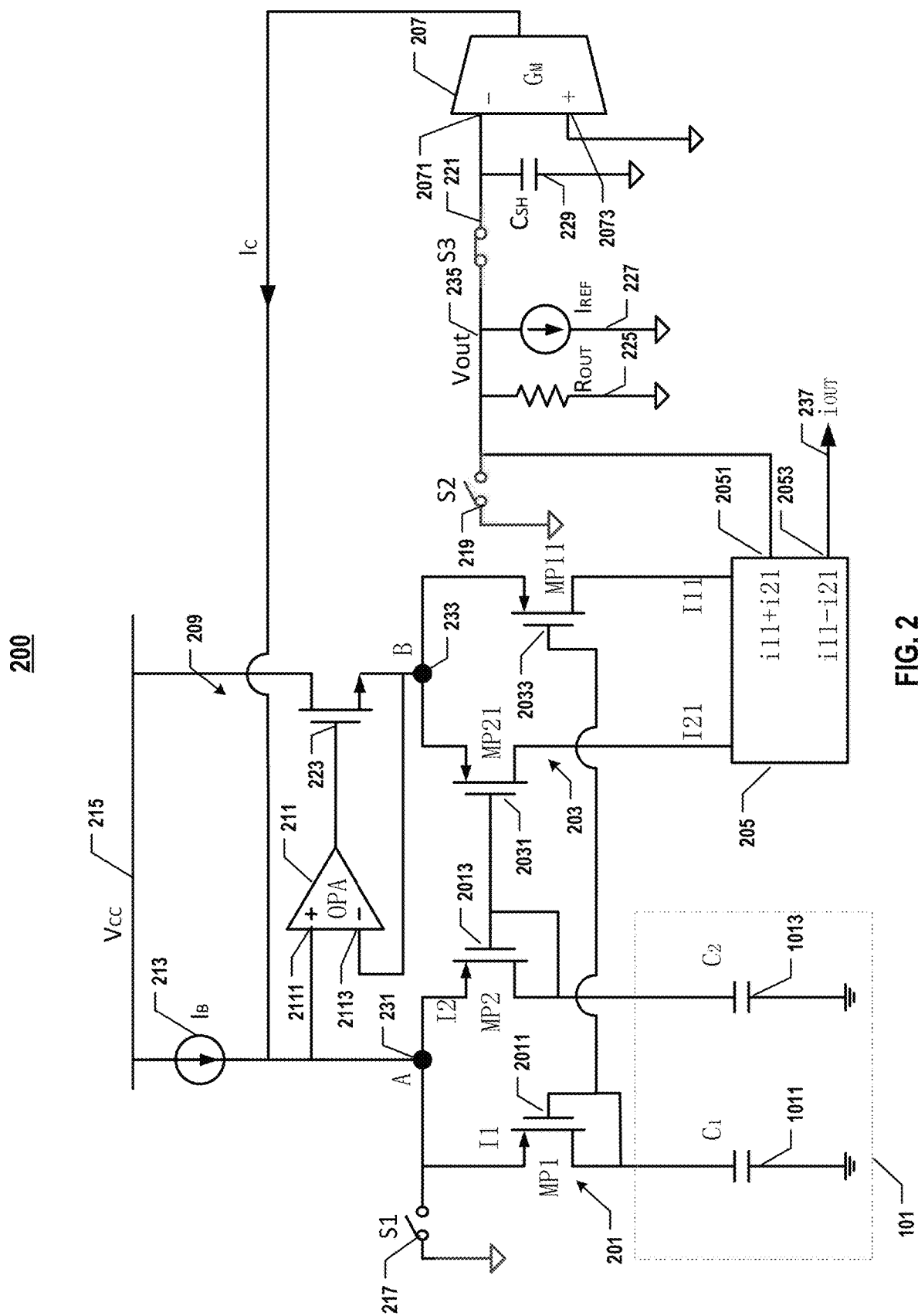
FIG. 2 illustrates a schematic diagram of a capacitive sensing circuit, according to some aspects of the present disclosure.

FIG. 2 illustrates a schematic diagram of a capacitive sensing circuit 200, according to some aspects of the present disclosure. Capacitive sensing circuit 200 may include a current mirror circuit 201 configured to receive two capacitance values C1 and C2 from two respective transparent electrodes 1011 and 1013 in touch panel 101. Current mirror circuit 201 may include a first transistor (MP1) 2011, a second transistor (MP2) 2013, a third transistor (MP21) 2031, and a fourth transistor (MP11) 2033. In some implementations, each of first transistor (MP1) 2011, second transistor (MP2) 2013, third transistor (MP21) 2031, and fourth transistor (MP11) 2033 may be P-channel metal-oxide-semiconductor (PMOS), or N-channel metal-oxide-semiconductor (NMOS). The first terminal (e.g., drain terminal) and the second terminal (e.g., gate terminal) of first transistor (MP1) 2011 are connected to each other and also connected to the second terminal (e.g., gate terminal) of fourth transistor (MP11) 2033. Therefore, a first input current I1 passing through the third terminal (e.g., source terminal) of first transistor (MP1) 2011 can be mirrored to a first mirrored current I11 passing through the first terminal (e.g., drain terminal) of fourth transistor (MP11) 2033. The ratio between first input current I1 and first mirrored current I11 (e.g., the multiplier of the current signals) can be determined by adjusting the ratio of parameters, e.g., the width and length (W/L) aspect ratio, of first transistor (MP1) 2011 and fourth transistor (MP11) 2033. Also, the first terminal (e.g., drain terminal) and the second terminal (e.g., gate terminal) of second transistor (MP2) 2013 are connected to each other and also connected to the second terminal (e.g., gate terminal) of third transistor (MP21) 2031. Therefore, a second input current I2 passing through the third terminal (e.g., source terminal) of second transistor (MP2) 2013 can be mirrored to a second mirrored current I21 passing through the first terminal (e.g., drain terminal) of third transistor (MP21) 2031. The ratio between second input current I2 and second mirrored current I21 (e.g., the multiplier of the current signals) can be determined by adjusting the ratio of parameters, e.g., the width and length (W/L) aspect ratio, of second transistor (MP2) 2013 and third transistor (MP21) 2031. In some implementations, a first switch (S1) 217 can be coupled to the third terminal (e.g., the source terminal) of first transistor (MP1) 2011 and configured to control first input current I1 and second input current I2 to be zero or the received capacitance signals in terms of the current.

Capacitive sensing circuit 200 may further include a current-differential current-summing circuit 205 coupled to current mirror circuit 201 and configured to receive two mirrored currents (e.g., I21 and I11). Current-differential current-summing circuit 205 may include a first output 2051 generating a summing current, and a second output 2053 generating a differential current. The differential current is seen as an Iout. The summing current is further transmitted to a transconductor circuit for a feedback loop. Accordingly, the summing current is transmitted to a first input (e.g., a negative input) 2071 of a transconductor 207 via a third switch (S3) 221. When third switch (S3) 221 is closed, the summing current is transmitted to the transconductor 207 and the feedback current Ic transmitted from the output of transconductor 207 can be determined. On the contrary, when third switch (S3) 221 is opened, the summing current is transmitted to passing through an output resistance Rout 225 and differentiated with a reference current Iref (e.g., provided by a reference current source 227) such that an output voltage Vout (e.g., measure by an output node 235) can be determined, where the reference current Iref can be determined by using the feedback current Ic received from the output terminal of transconductor 207 when third switch (S3) 221 is closed. By doing so, the summing current I11+I21 can be kept constant regardless the effect of the parasitic capacitor in the circuit. Therefore, the disclosed design provides a low sensitivity to the parasitic capacitor. In some implementations, a second switch (S2) 219 can be coupled to first output 2051 of current-differential current-summing circuit 205 and configured to control the summing current I11+I21 to be zero or not. The output voltage Vout at the input of transconductor 207 is sampled through a hold capacitor Csh 229. A second input (e.g., a positive input) 2073 of transconductor 207 is grounded.

The feedback current Ic is further transmitted to a clamping circuit 209. Clamping circuit 209 may include an input voltage line 215 to which an input voltage Vcc is configured to be applied. Clamping circuit 209 may further include a bias current source 213 configured to apply a bias current Tb to current mirror circuit 201. In some implementations, the bias current Tb is applied from input voltage line 215 to a first node (A) 231 where the third terminal (e.g., source terminal) of first transistor (MP1) 2011 and the third terminal (e.g., source terminal) of second transistor (MP2) 2013 are interconnected. The feedback current Ic is transmitted to first node (A) 231. First node (A) 231 is a common source node of first transistor (MP1) 2011 and second transistor (MP2) 2013, and second node (B) 233 is a common source node of third transistor (MP21) 2031 and fourth transistor (MP11) 2033.

Clamping circuit 209 may include an operational amplifier (OPA) 211 and a fifth transistor 223. First node (A) 231 is connected to a first input end 2111 (e.g., a positive input end) of operational amplifier (OPA) 211, and a second node (B) 233 is connected to a second input end 2113 (e.g., a negative input end) of operational amplifier (OPA) 211. Second node (B) 233 is a node where the third terminal (e.g., source terminal) of third transistor (MP21) 2031 and the third terminal (e.g., source terminal) of fourth transistor (MP11) 2033 are interconnected. The output of operational amplifier (OPA) 221 is connected to a second terminal (e.g., gate terminal) of fifth transistor 223. Input voltage line 215 is connected to first terminal (e.g., a drain terminal) of fifth transistor 223, and the input voltage Vcc is applied to the first terminal (e.g., a drain terminal) of fifth transistor 223. A third terminal (e.g., source terminal) of fifth transistor 223 is connected to second node (B) 233 and second input 2113 end (e.g., a negative input end) of operational amplifier (OPA) 211. As such, clamping circuit 209 is configured to let Va=Vb such that the current difference between two common source nodes—first node (A) 231 and second node (B) 233 can be, for instance, less than 1%. Therefore, the channel length modulation effect can be minimized. Also, the clamping circuit 209 is also configured to provide overvoltage protection and prevent high current breakthrough the capacitors or transistors in capacitive sensing circuit 200. In some implementations, fifth transistor 223 may be an NMOS.

Figure 3:
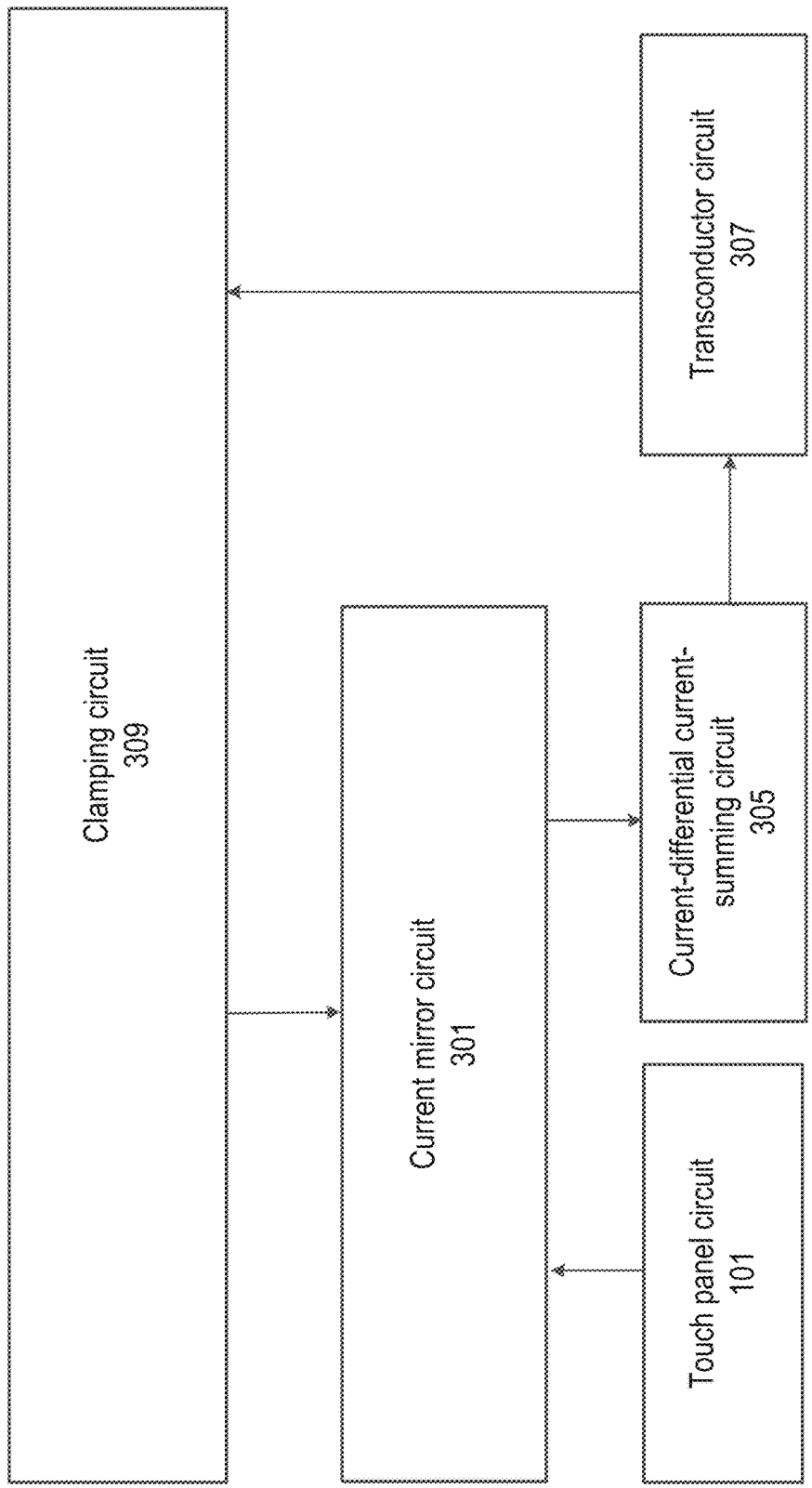
FIG. 3 illustrates a schematic diagram of a capacitive sensing system, according to some aspects of the present disclosure.

FIG. 3 illustrates a schematic diagram of a capacitive sensing system 300, according to some aspects of the present disclosure. Capacitive sensing system 300 may include a current mirror circuit 301 (e.g., corresponding to current mirror circuit 201 in FIG. 2) in which at least two capacitance values in terms of current value can be measured. Capacitive sensing system 300 may further include a current-differential current-summing circuit 305 (e.g., corresponding current-differential current-summing circuit 205 in FIG. 2). The at least two currents measured from current mirror circuit 301 can be mirrored to become two output currents, and the two output currents are then transmitted to current-differential current-summing circuit 305. Capacitive sensing system 300 may further include a transconductor circuit 307 configured to receive an output voltage Vout and provide a feedback current Ic for creating a feedback loop to compensate and reduce noises or abrupted pulses. Capacitive sensing system 300 may further include a clamping circuit 309 (e.g., corresponding to clamping circuit 209 in FIG. 2) configured to make two voltages on two respective nodes in the current mirror circuit almost the same, thereby minimizing the current difference between the two respective common source nodes for, e.g., less than 1%. The feedback current Ic is transmitted to clamping circuit 309, in which a feedback loop circuit including an operational amplifier is configured to create a negative feedback to make the two voltages on the two respective common source nodes in the current mirror circuit almost the same, e.g., minimizing the current difference between the two respective common source nodes for, e.g., less than 1%. By doing so, the sensitivity of capacitive sensing system 300 can be increased, and thus the user experience will be more satisfying.

Figure 4:
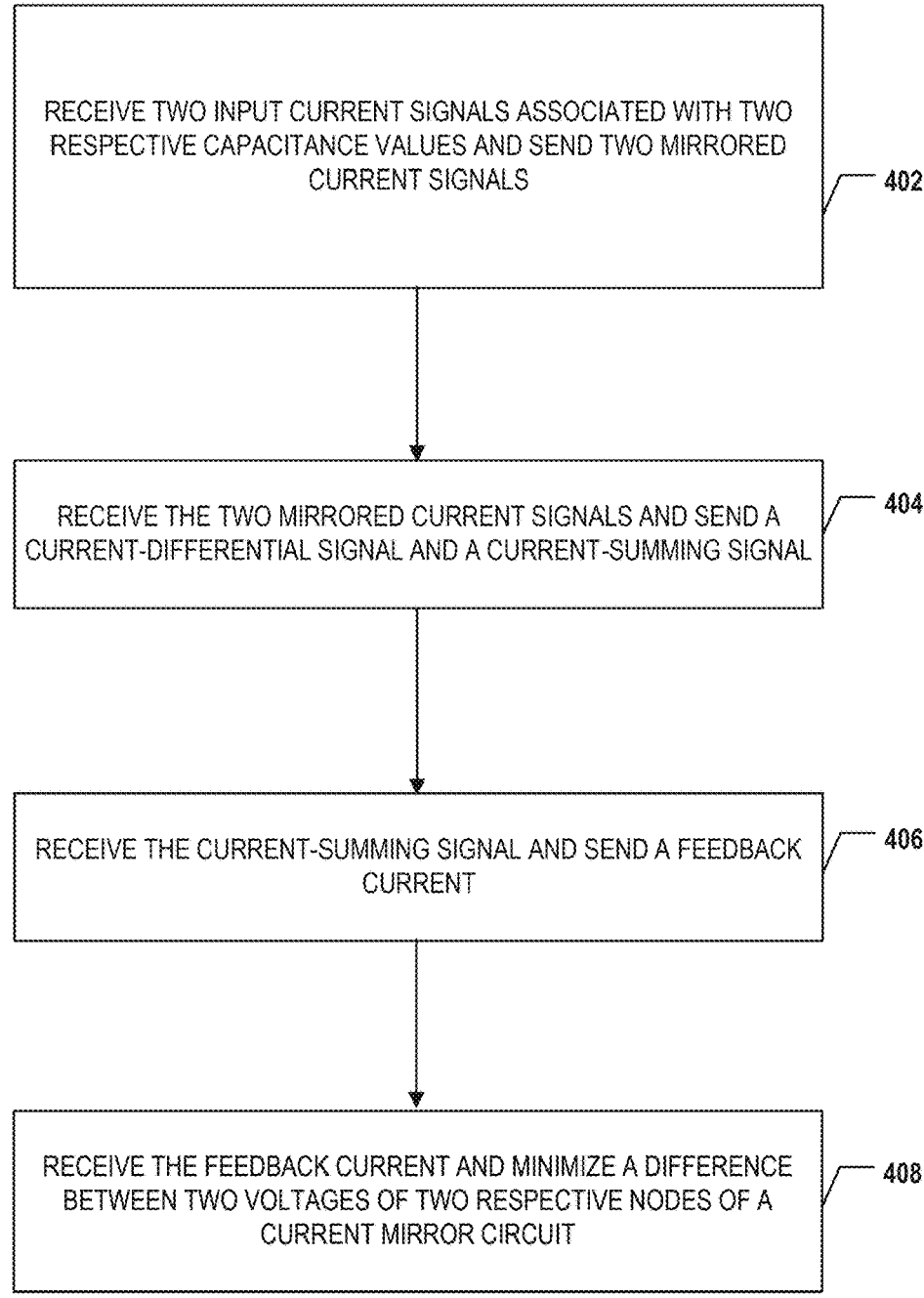
FIG. 4 illustrates a flowchart of a method for controlling a capacitive sensing circuit, according to some aspects of the present disclosure.

FIG. 4 illustrates a flowchart of a method 400 for controlling a capacitive sensing circuit (e.g., capacitive sensing circuit 200 in FIG. 2), according to some aspects of the present disclosure. It is understood that the operations shown in method 400 are not exhaustive and that other operations can be performed as well before, after, or between any of the illustrated operations.

Referring to FIG. 4, method 400 starts at operation 402, in which two input current signals associated with two respective capacitance values are received and two mirrored current signals are sent. For example, two input current signals (e.g., first input current I1 and second input current I2 in FIG. 2) associated with two respective capacitance values (e.g., two respective capacitance values C1 and C2 from two transparent electrodes 1011 and 1013 in FIG. 2) can be received by current mirror circuit 201. The two input current signals are mirrored to be two mirrored current signals (e.g., first mirrored current I11 and second mirrored current I21 in FIG. 2) and the two mirrored current signals are then sent to a current-differential current-summing circuit (e.g., current-differential current-summing circuit 205 in FIG. 2).

Method 400 proceeds to operation 404, as illustrated in FIG. 4, in which the two mirrored current signals are received and a current-differential signal and a current-summing signal are sent. For example, the two mirrored current signals (e.g., first mirrored current I11 and second mirrored current I21 in FIG. 2) are received by the current-differential current-summing circuit (e.g., current-differential current-summing circuit 205 in FIG. 2) and the current-differential current-summing circuit then sends out a current-differential signal (e.g., current-differential signal 2053 in FIG. 2) and a current-summing signal (e.g., current-summing signal 2051 in FIG. 2). The current-differential signal is then outputted as an output current (e.g., output current 237 as in FIG. 2). The current-summing signal is then transmitted and passing through an output resistance (e.g., an output resistance Rout 225 in FIG. 2).

Method 400 proceeds to operation 406, as illustrated in FIG. 4, in which the current-summing signal is also transmitted and to be received by a transconductor, and a feedback current is sent from the transconductor. For example, the current-summing signal is transmitted and to be received by the transconductor (e.g., transconductor 207 in FIG. 2), and the transconductor then sends a feedback current (e.g., feedback current Ic in FIG. 2) to the current mirror circuit. In some implementations, before the feedback current is sent to the current mirror circuit, a clamping circuit is configured to minimize a difference between two voltages of two respective nodes of the current mirror circuit.

Method 400 proceeds to operation 408, as illustrated in FIG. 4, in which the feedback current is received by the clamping circuit and the clamping circuit sets a difference between two voltages of two respective nodes of the current mirror circuit to be minimized. For example, the feedback current Ic is received by the clamping circuit (e.g., clamping circuit 209 in FIG. 2). And the clamping circuit sets a difference between two voltages of two respective nodes (e.g., a first common source node A 231 and a second common source node B 233) of the current mirror circuit (e.g., current mirror circuit 201) to be minimized. Therefore, the channel length modulation effect can be minimized, the sensitivity and the quality of the touch panel device can be effectively enhanced, and the overall user experiences are also increased.

The foregoing description of the specific implementations can be readily modified and/or adapted for various applications. Therefore, such adaptations and modifications are intended to be within the meaning and range of equivalents of the disclosed implementations, based on the teaching and guidance presented herein.

The breadth and scope of the present disclosure should not be limited by any of the above-described exemplary implementations, but should be defined only in accordance with the following claims and their equivalents.

What is claimed is:

1. A circuit for capacitive sensing, comprising:
   a current mirror circuit configured to receive two input current signals associated with two respective capacitance values and send two mirrored current signals;
   a current-differential current-summing circuit configured to receive the two mirrored current signals from the current mirror circuit and send a current-differential signal and a current-summing signal;
   a transconductor circuit comprising a transconductor, wherein the transconductor circuit is configured to receive the current-differential signal and send a feedback current; and
   a clamping circuit configured to receive the feedback current and minimize a difference between two voltages of two respective nodes of the current mirror circuit.

2. The circuit of claim 1, wherein the current mirror circuit comprises a first transistor, a second transistor, a third transistor, and a fourth transistor, and wherein the first transistor and the second transistor are connected via a first common source node, and the third transistor and the fourth transistor are connected via a second common source node.

3. The circuit of claim 2, wherein the first transistor and the second transistor are configured to receive the two input current signals associated with the two respective capacitance values, and wherein the third transistor and the fourth transistor are configured to send the two mirrored current signals.

4. The circuit of claim 2, wherein a first gate of the first transistor and a fourth gate of the fourth transistor are connected, and a second gate of the second transistor and a third gate of the third transistor are connected.

5. The circuit of claim 1, wherein the current-differential signal is configured to be an output current.

6. The circuit of claim 1, wherein the current-summing signal is configured to provide an output voltage passing through an output resistance.

7. The circuit of claim 1, wherein the transconductor comprises a negative input terminal and a positive input terminal, and wherein the negative input terminal is configured to receive the current-differential signal, and the positive input terminal is grounded.

8. The circuit of claim 1, wherein the clamping circuit comprises a bias current source, an operational amplifier, and a fifth transistor, and wherein a positive input end of the operational amplifier is configured to receive the feedback current, a negative input end of the operational amplifier is connected to be connected to a source end of the fifth transistor, and an output end of the operational amplifier is configured to be connected to a gate end of the fifth transistor.

9. The circuit of claim 8, wherein the clamping circuit is configured to be connected to an input voltage, wherein the input voltage is provided to the current mirror circuit via the bias current source and the fifth transistor.

10. The circuit of claim 1, wherein the current mirror circuit is configured to receive the two input current signals associated with the two respective capacitance values of a touch panel circuit.

11. A touch panel device, comprising:
a touch panel circuit comprising a capacitance array;
a driving circuit coupled to the touch panel circuit and configured to drive a transmitter voltage to the capacitance array;
a sensing control circuit coupled to the touch panel circuit and configured to receive a receiver voltage from the capacitance array;
a capacitive sensing circuit coupled to the sensing control circuit and configured to detect a capacitance of the capacitance array;
a microcontroller unit (MCU) configured to perform operations of the touch panel device; and
a memory configured to store data received from the capacitive sensing circuit or the MCU, wherein the capacitive sensing circuit comprises:
    a current mirror circuit configured to receive two input current signals associated with two respective capacitance values and send two mirrored current signals;
    a current-differential current-summing circuit configured to receive the two mirrored current signals from the current mirror circuit and send a current-differential signal and a current-summing signal;
    a transconductor circuit comprising a transconductor, wherein the transconductor circuit is configured to receive the current-differential signal and send a feedback current; and
    a clamping circuit configured to receive the feedback current and minimize a difference between two voltages of two respective nodes of the current mirror circuit.

12. The touch panel device of claim 11, wherein the current mirror circuit comprises a first transistor, a second transistor, a third transistor, and a fourth transistor, and wherein the first transistor and the second transistor are connected via a first common source node, and the third transistor and the fourth transistor are connected via a second common source node.

13. The touch panel device of claim 11, wherein the current-differential signal is configured to be an output current.

14. The touch panel device of claim 11, wherein the current-summing signal is configured to provide an output voltage passing through an output resistance.

15. The touch panel device of claim 11, wherein the transconductor comprises a negative input terminal and a positive input terminal, and wherein the negative input terminal is configured to receive the current-differential signal, and the positive input terminal is grounded.

16. A method for controlling a circuit for capacitive sensing, comprising:
receiving two input current signals associated with two respective capacitance values and sending two mirrored current signals;
receiving the two mirrored current signals and sending a current-differential signal and a current-summing signal;
receiving the current summing signal and sending a feedback current; and
receiving the feedback current and minimizing a difference between two voltages of two respective nodes of a current mirror circuit.

17. The method of claim 16, wherein the circuit for capacitive sensing comprises:
the current mirror circuit;
a current-differential current-summing circuit;
a transconductor circuit; and
a clamping circuit, wherein receiving the two input current signals associated with the two respective capacitance values and sending the two mirrored current signals are performed by the current mirror circuit coupled to a touch panel circuit, wherein the two respective capacitance values are received by two respective transparent electrodes in the touch panel circuit.

18. The method of claim 17, wherein receiving the two mirrored current signals and sending the current-differential signal and the current-summing signal are performed by the current-differential current-summing circuit.

19. The method of claim 17, wherein receiving the current summing signal and sending the feedback current are performed by the transconductor circuit.

20. The method of claim 17, wherein receiving the feedback current and minimizing the difference between the two voltages of the two respective nodes of the current mirror circuit are performed by the clamping circuit.

* * * * *